Patented Feb. 23, 1937

2,071,932

UNITED STATES PATENT OFFICE 2,071,932

PROCESS OF POLYMERIZATION

Maurice L. Macht, Jersey City, N. J., assignor, by mesne assignments, to E. I. du Pont de Nemours & Company, Wilmington, Del., a corporation of Delaware No Drawing. Application March 8, 1935, Serial No. 10,034

2 Claims. (Cl. 260—2)

This invention relates to a process of polymerization and, more particularly, to a process of polymerizing methacrylic acid esters and related compounds to obtain a granular product.

Various processes are known which involve the use of methacrylic acid ester polymers wherein the polymers are worked up with solvents, auxiliary ingredients, and the like, for the preparation of plastic masses. The polymeric substances have, however, not been available in forms completely satisfactory for use in such processes because the methods heretofore known for the preparation of such polymers have not been capable of producing the polymers in desirable physical form, free from contamination, and at reasonable cost.

Polymerization of methacrylic acid esters has heretofore been conducted by simply heating the monomer, with or without catalysts, plasticizers, and other ingredients, in a vessel provided with a reflux condenser. This process yields the polymer in the form of a massive block conforming to the dimensions of the vessel. This massive block must be reduced to a granular form before it can be used and the grinding of massive, tough material of this type, even when facilitated by the presence of bubbles developed by the heat of the reaction, is tedious and laborious and correspondingly expensive and, with ordinarily available grinding equipment, almost inevitably results in contamination of the granular material with dirt, metallic particles, and other foreign material. This method of polymerization is further objectionable due to the difficulty of keeping it under control in the face of the development of heat by the exothermic reaction of polymerization which may even be so rapid as to cause danger. It has been proposed to overcome this objection by conducting the polymerization in stages so as to limit the possibilities of excessive development of heat at any one time. This modified procedure, however, involves more trouble and increases expense.

It has also been proposed heretofore to conduct polymerization of methacrylic acid esters in the presence of liquid vehicles. These processes yield the polymer in more or less finely divided form but, necessarily, involve subsequent steps of separation of the polymer from the liquid vehicle, e. g. by filtration and drying, and thus expose the polymer to serious risk of contamination, as well as increasing the cost of producing the polymer. Furthermore, the dry product tends to be undesirably bulky and hard to handle, that is, it does not have a satisfactorily high bulk density as this property is expressed in molding shop practice.

An object of the present invention is to provide a simple and economical process of polymerizing methacrylic acid esters to the form of granular solids without the use of liquid vehicles or with their use in such strictly limited amounts as to differ fundamentally from the heretofore proposed processes wherein such vehicles are used in large amounts.

A further and particular object of the invention is to produce the granular polymer in a single step and under conditions which exclude the contamination of the product. A further object of the invention is to provide a process of polymerizing these esters that will give a product of the most satisfactory properties at a very low cost. Other objects of the invention will be apparent from the description of the invention given hereinafter.

The above objects are accomplished according to the present invention by kneading a composition containing a substantial amount of a polymerizable methacrylic acid ester in monomeric form, the character of said composition being such that, upon polymerization of said ester, the composition will reach a sufficiently hard and solid state to permit granulation, at a temperature high enough to initiate polymerization of said ester, and continuing said kneading until a granular mass is obtained. The continued kneading may be carried out at about the same temperature used to initiate polymerization of the ester and, where the polymerized composition may be readily granulated at such temperatures, it is usually convenient to proceed in this manner; or it may be carried out at even higher temperatures if granulation of the polymerized composition can be effected at such temperatures; or it may be carried out at appreciably lower temperatures, and this last procedure will be employed where granulation of the polymerized composition can only be efficiently accomplished at such temperatures. For illustration, a polymerizable methacrylic acid ester may be kneaded at about 90° C.

to initiate polymerization. If the ester is the glycol di-methacrylate, the kneading may be continued at the same temperature or a much higher one as, when polymerized, this ester will granulate readily at elevated temperatures. On the other hand if the ester is ethyl methacrylate, the kneading might be carried out at 90° C. until polymerization was about complete, then the temperature of the mass dropped to 50° C., or even room temperature, while kneading was continued, in order to facilitate granulation. The softening point of ethyl methacrylate polymer would be too low to make it feasible to granulate this ester at a temperature of 90° C. although such temperature might well be used to initiate polymerization of the monomeric ester.

More specifically, the present invention resides in the discovery that, by introducing a monomeric methacrylic acid ester, to which may be added a polymerization catalyst, polymeric methacrylic acid esters, plasticizers and other auxiliary agents, into a mixer of rugged construction provided with a mixing or kneading blade adapted to keep all of the material working constantly, supplying sufficient heat to at least initiate polymerization of the monomeric ester, and continuing the kneading action, the monomer will uniformly polymerize without building up local areas of excessively high temperature and the mass will pass into a plastic state and from there to a state where the plasticity is so reduced that the mass breaks up into a more or less uniformly granulated composition. Further, that this kneading can be carried out without causing impractical strains on fairly rugged equipment and that there results a granulated material, clean and of high bulk density, well suited for use in molding operations and other plastics procedure, with a minimum of expense and trouble.

Since the polymerization of the methacrylic acid ester monomer will almost invariably cause volatilization of an appreciable amount of the monomer, the present process, for obvious economical reasons, is preferably carried out in a closed mixer provided with a reflux condenser whereby the volatilized monomer will be condensed and returned to the mixer and loss of monomer thus avoided.

In order to illustrate the invention, the following specific examples are given, parts being given by weight:—

*Example 1.*—Liquid methyl methacrylate monomer is placed in a jacketed mixer of sturdy construction provided with a reflux condenser and with blades commonly designated as "sigma" blades, which blades are mounted upon grease-proof bearings. With the cover of the mixer tightly closed and with adequate circulation of water in the reflux condenser, the liquid in the mixer is heated by the passage of steam at low pressure through the jacket and the blades of the mixer are set into motion. Polymerization of the monomer gradually takes place as a result of the heating and the liquid gradually becomes more and more viscous. The heat of the polymerizing reaction builds up the temperature of the mass and causes some volatilization of monomer which is caught and returned by the reflux. After about 4½ hours of active refluxing and kneading, the mass reaches a condition in which it is no longer plastic even at the prevailing temperature of approximately 100° C. and it thereupon begins to disintegrate from a continuous mass into fragments which, upon the continuation of the kneading, become reduced to a more or less uniform granulated condition. At the end of 5 hours, polymerization is substantially completed as evidenced by a practical cessation of condensation in the reflux and the contents of the mixer are discharged in the form of a perfectly clean, uncontaminated granular methyl methacrylate polymer. The polymer is then in a convenient physical form to be readily attacked by solvents and plasticizers and thus to be worked up into doughs, and the like, by known processes, or to be molded according to known processes.

*Example 2.*—1 part of benzoyl peroxide is dissolved in 100 parts of liquid methyl methacrylate monomer by dissolving the catalyst in a small portion of the liquid, filtering the solution, and adding it to the balance of the liquid. Polymerization of the monomer is carried out as in Example 1, but, due to the presence of the polymerization catalyst, the reaction is speeded up so that it is completed at the end of one hour.

*Example 3.*—A mixture is made of the following ingredients:

|  | Parts |
|---|---|
| Methyl methacrylate monomer | 100 |
| Diethoxyethyl phthalate | 11 |
| Stearic acid | 0.5 |
| Benzoyl peroxide | 1.0 |

The benzoyl peroxide and stearic acid, the latter serving as a lubricant during subsequent molding of the polymer, are dissolved in a small part of the liquid monomer, the solution filtered and added to the rest of the bath. The polymerization is carried out in the same type of equipment as in Example 1, the jacket being heated to approximately 100° C. by the passage of steam. As the reaction proceeds, the liquid gradually thickens and after about 20 minutes begins to bubble. This bubbling reaches a maximum in about 30 minutes and at the end of 1 hour the mass has been transformed into a granular product.

*Example 4.*—A mixture is made of the following ingredients:

|  | Parts |
|---|---|
| Monomeric methyl methacrylate | 100 |
| Polymeric methyl methacrylate | 23 |
| Diamyl phthalate | 11.5 |
| Stearic acid | 0.5 |

The polymer is dissolved in the monomer containing the other ingredients and a thick syrup results. This is introduced into a mixer of the type described in Example 1 and the mixer set in motion with steam introduced in the jacket at a pressure sufficient to give a temperature of about 110° C. At the end of 4 hours the mixture has become extremely viscous and starts to break up into small chunks. This breaking up is accompanied by a more copious volatilization of unaltered monomer than up to this time and this ceases after about 30 minutes. At this point the product is substantially completely polymerized and is in a desirable granular form.

*Example 5.*—A mixture is made up of the following ingredients:

|  | Parts |
|---|---|
| Monomeric methyl methacrylate | 100 |
| Polymeric methyl methacrylate | 100 |
| Diamyl phthalate | 20 |
| Stearic acid | 1 |
| Benzoyl peroxide | 0.5 |

The last two ingredients are put into a solution of the monomeric methyl methacrylate as in Example 3 and the polymeric methyl methacrylate is mixed with the rest of the batch. This gives a mixture which at room temperature is a soft dough. The mixture is worked as in Example 1 and at the end of 2 hours has been converted into a granular product containing substantially no unconverted monomer.

*Example 6.*—A mixture is made of the following ingredients:

| | Parts |
|---|---|
| Monomeric methyl methacrylate | 100 |
| Benzoyl peroxide | 0.8 |
| Stearic acid | 0.8 |
| Hexane | 15 |

The benzoyl peroxide and stearic acid are dissolved in a small portion of monomer as in Example 3 and added to the remainder of the batch. Polymerization is carried out as in Example 1. At the end of about 1 hour foaming begins which increases during the next thirty minutes. The mass takes the form of a soft dough which gradually becomes stiffer and, at the end of 4 hours from the start, begins to break up. At this point refluxing is discontinued and the hexane removed by distillation.

*Example 7.*—A mixture is made of the following ingredients:

| | Parts |
|---|---|
| Methyl methacrylate monomer | 100 |
| Alpha cellulose board | 67 |
| Stearic acid | 1.4 |
| Benzoyl peroxide | 1.4 |

The benzoyl peroxide and stearic acid are introduced in the monomer as in the previous examples and the liquid monomer is placed in the mixer and the blades set into motion. The soft alpha cellulose board is fed in gradually and is thoroughly broken up and distributed through the liquid with the formation of a fluffy wet pulp. This breaking up of the board is facilitated by the use of a serrated saddle and serrated blades in the mixer. The cover of the mixer is then fastened down and the reflux condenser set into motion and steam run into the jacket of the mixer. In approximately 1 hour the mixer begins to distill considerable monomer, which is returned by the reflux, and the batch becomes gradually thickened. At the end of 2 hours the batch has been transformed into a rather fluffy white product comprising a homogeneous mixture of the ingredients. It is in a semi-granular condition which is readily reduced to a granular form suitable for molding.

*Example 8.*—A mixture is made of the following ingredients:

| | Parts |
|---|---|
| Methyl methacrylate monomer | 100 |
| Benzoyl peroxide | 0.5 |

The mixture is processed in a mixer as described in Example 1. Low pressure steam is circulated through the jacket to initiate reaction which develops vigorously toward the end of the first 25 minutes of processing. At the end of this time, cooling water is circulated in the jacket in place of steam and, at the end of 43 minutes from the start, the batch is discharged from the mixer as a granular mass comprising a mixture of monomer and polymer.

*Example 9.*—A mixture of 100 parts of monomeric methyl methacrylate and 0.5 part of benzoyl peroxide was processed as in Example 8, with heating for 40 minutes, followed by cooling for 10 minutes. In this manner a granular mass comprising a mixture of monomer and polymer was obtained.

*Example 10.*—A mixture of 100 parts of monomeric methyl methacrylate and 0.5 part of benzoyl peroxide was processed in the mixer with heating for 50 minutes. There is then added to the mixer 10 parts of monomeric glycol di-methacrylate and 0.05 part of benzoyl peroxide and at the same time the steam in the jacket of the mixer is replaced with cooling water. At the end of an additional 10 minutes of kneading a homogeneous mass is discharged. This mass contains methyl methacrylate mostly in polymeric form and glycol di-methacrylate mostly in monomeric form.

*Example 11.*—A mixture is made of the following ingredients:

| | Parts |
|---|---|
| Monomeric ethyl methacrylate | 100 |
| Diethoxyethyl phthalate | 5 |
| Benzoyl peroxide | 1 |

The benzoyl peroxide is dissolved in a small part of the monomer and this solution filtered and added to the rest of the batch. The equipment set forth in Example 1 is used and the polymerization carried out as in Example 1 except that after polymerization is effected, cooling water is employed to lower the temperature of the contents of the mixer to about 50° C., the kneading action being continued until a granular product is obtained. The purpose of the cooling water is to put the composition in a condition where it may readily be broken up into a granular product.

*Example 12.*—A mixture is made of the following ingredients:

| | Parts |
|---|---|
| Monomeric cyclohexyl methacrylate | 100 |
| Dimethyl phthalate | 10 |
| Benzoyl peroxide | 0.8 |

The mixture is processed as in Example 11 and there is ultimately obtained a granular solid comprising a homogeneous mixture of polymeric cyclohexyl methacrylate and dimethyl phthalate.

The above examples are merely illustrative of various means of carrying out the present invention which may be varied widely without departing from the spirit thereof. The composition to be processed must be one which, at least when the monomer content thereof becomes fully polymerized, will have so little plasticity at the prevailing temperature that it will break up into granular form on continuation of kneading. By circulating cooling water through the jacket of the mixer, or using other cooling means, the prevailing temperature in the mixer may be quite low. As a practical matter, the value of this invention is somewhat reduced if the composition is of such a character that, at the completion of polymerization, it requires a temperature below room temperature to cause it to break up into granular form. Subject to the above, the invention broadly relates to any composition containing a monomeric methacrylic acid ester.

Of the monomeric esters particularly useful in the present invention, methyl methacrylate is outstanding. Other esters found useful include ethyl, propyl, butyl, isobutyl, and phenyl mono-methacrylates, and glycol di-methacrylate.

As is to be expected, a wide range of auxiliary ingredients may be added to the monomer. In order to reduce the time cycle for the process, it is advantageous to employ polymerization catalysts such as benzoyl peroxide, acetyl benzoyl peroxide, hydrogen peroxide, tetraethyl lead, sodium perborate, acetic anhydride, and sodium bisulphite.

Plasticizers may be included in the composition and, if desired, a mixture of two or more plastisizers may be employed. Suitable plasticizers include the following:

Dimethyl phthalate
Diethyl phthalate
Dibutyl phthalate
Dipropyl phthalate
Diamyl phthalate
Diphenyl phthalate
Triphenyl phosphate
Tricresyl phosphate
Tributyl phosphate
p-Toluene sulphonamide
Ethyl p-toluene sulphonamide
Methyl cyclohexanone
Dibenzylin
Dicresylin
Triacetin
Tributyrin
Tripropionin
Chlor naphthalene
Butyl cyclohexyl phthalate
Diphenyl methane
p-Tertiary amyl phenol
b-Naphthol ethyl ether
Benzyl benzoate
Ethylene glycol dibenzoate
Ethyl lactate
Diisoamyl tartrate
Dibutyl tartrate
Diethoxyethyl phthalate
Dibutoxyethyl phthalate
Diethylene glycol diisobutyrate
Dixylyl ethane
Castor oil
Camphor
Methyl benzoyl benzoate
Ethyl benzoyl benzoate
Butyl benzoyl benzoate
Ethoxyethyl benzoyl benzoate
Methyl cyclohexyl adipate Fillers may be added to the monomeric ester and tend to enhance the stiffness or dryness of the ultimate polymerized mass and, consequently, the ease of granulating the composition. Among suitable fillers are wood flour, refined cellulose pulp, ground paper, clay, gypsum, barytes, whiting, talc, and asbestos. Also, coloring matter such as pigments, dyestuffs, metallic powders, pearl essence, and the like, may be included and, when the composition is to be used for molding, it is sometimes advantageous to employ lubricants such as carnauba wax, candelilla wax, aluminum palmitate, zinc stearate, and stearic acid.

As illustrated in some of the examples polymeric methacrylic acid esters may be added to the composition, such esters may be either the same as the monomeric ester or a different one.

As illustrated in Example 6, a small proportion of liquid miscible with the initial ingredients may be added to maintain the viscosity of the mass at a lower level throughout the reaction than would otherwise be the case. A liquid which is a solvent for both the monomeric and polymeric methacrylic acid ester may be used for this purpose but a liquid which is a non-solvent for the polymer is preferred since its presence promotes the breaking up of the mass at or near the completion of the polymerization. Such a liquid is preferably one of low boiling point so that it may be readily removed from the product by evaporation. In any event, the liquid would be used in relatively small quantities and, in general, the process may be characterized as one that is carried out in the absence of any substantial amount of volatile solvent. Due to varying solubility characteristics of the compositions to be treated, the selection of suitable auxiliary liquids is largely determined by those skilled in the art with respect to the specific composition under consideration. Among such liquids would be included hexane, gasolene, water, ethanol, methanol, water-methanol mixtures, and water-ethanol mixtures.

It will be noted that in some of the examples the kneading is deliberately stopped short of complete polymerization of the monomeric methacrylic acid ester. If a composition containing monomer is desired, this expedient may be resorted to but polymerization will have to be carried out to a sufficient degree so that the mass will break up into granular form at the prevailing temperature.

As will be understood by those skilled in the art, the present invention is not limited to any particular design of mixer. The mixer should be of sturdy construction and of a type that will thoroughly knead the mass throughout. For economical operation, a closed type mixer provided with heating means and a reflux condenser to prevent the escape of volatilized monomer will ordinarily be used. The clearance between the blades and the walls of the mixer is preferably rather small in order to minimize any temporary building up of a crust of materials upon the wall. Any of the ordinary blade shapes used in mixers are suitable such as the single curve, fish tail, nubbin, and sigma.

The present invention provides a simple and economical process whereby a polymerizable methacrylic acid ester in monomeric form in clean condition may be converted in a single operation in a closed vessel, into a solid polymeric product which is not only free from contamination but also is in a granular form convenient for subsequent processing. Furthermore, auxiliary ingredients desired in the final product may be incorporated in the initial batch, making it possible to turn out granulated molding compounds, filled or unfilled, from monomeric raw material in a single operation.

As many apparently widely different embodiments of this invention may be made without departing from the spirit and scope thereof, it is to be understood that the invention is not limited to the specific embodiments thereof except as defined in the appended claims.

I claim:

1. A process comprising kneading a composition containing a substantial amount of monomeric methyl methacrylate and a polymerization catalyst therefor, the character of said composition being such that upon polymerization of said methyl methacrylate the composition will reach a sufficiently hard and solid state to permit granulation, in a closed mixer provided with a reflux condenser at a temperature of about 100° C. and continuing said kneading until a granular mass is obtained.

2. A process comprising kneading a composition containing a substantial amount of monomeric methyl methacrylate and a polymerization catalyst therefor, the character of said composition being such that upon polymerization of said methyl methacrylate the composition will reach a sufficiently hard and solid state to permit granulation at 100° C., in a closed mixer provided with a reflux condenser at a temperature of about 100° C. and continuing said kneading at approximately that temperature until a granular mass is obtained.

MAURICE L. MACHT.